Feb. 20, 1968  W. MERTENS ETAL  3,369,947
METHOD OF TREATING ARTICLES WITH POLYMERIZATION
OR POLYADDITION REACTIONABLE SYSTEMS
Filed April 7, 1964  4 Sheets-Sheet 1
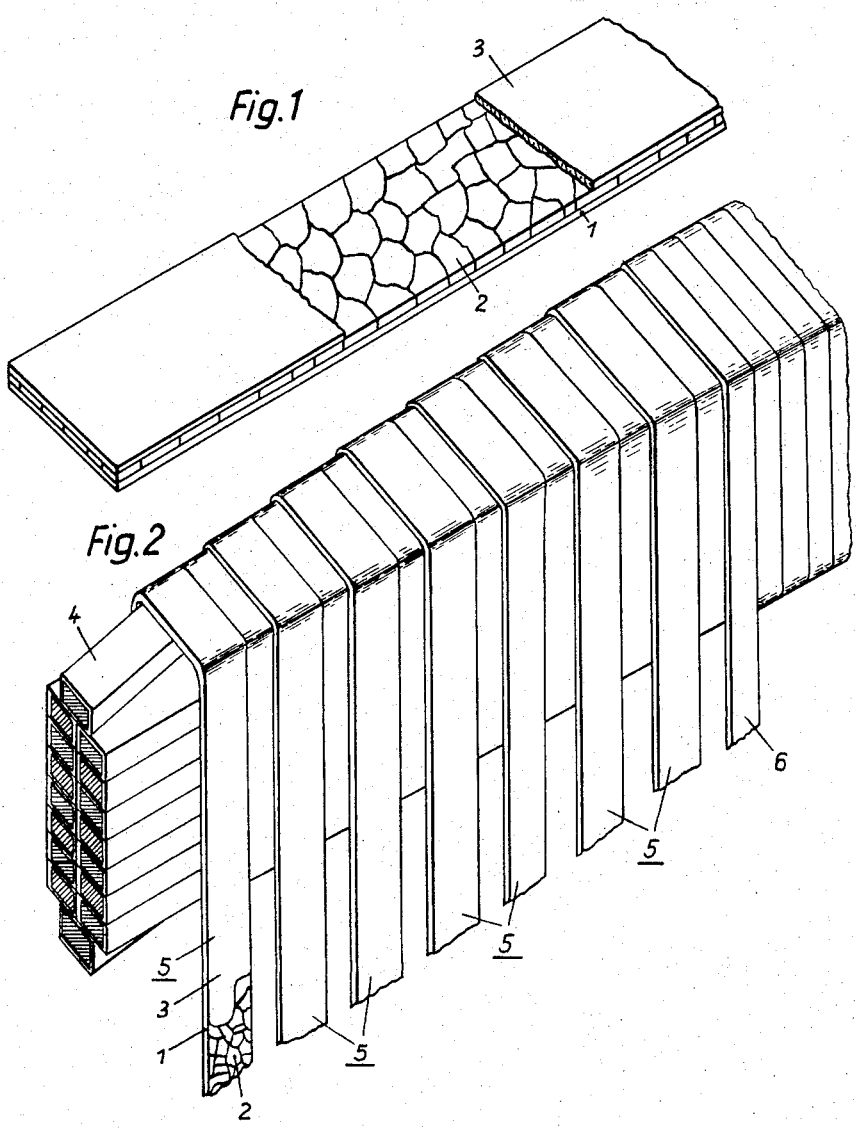
Inventors:
Willi Mertens,
Hartmut Meyer,
Jürgen Berger

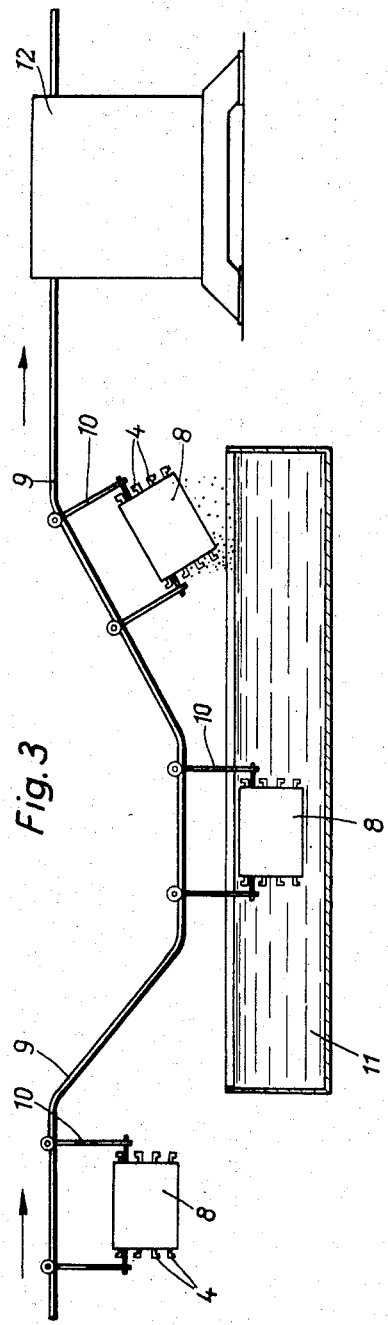
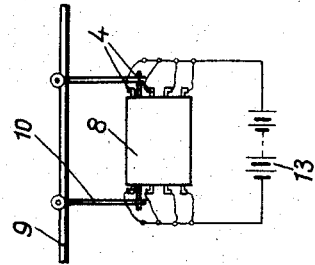

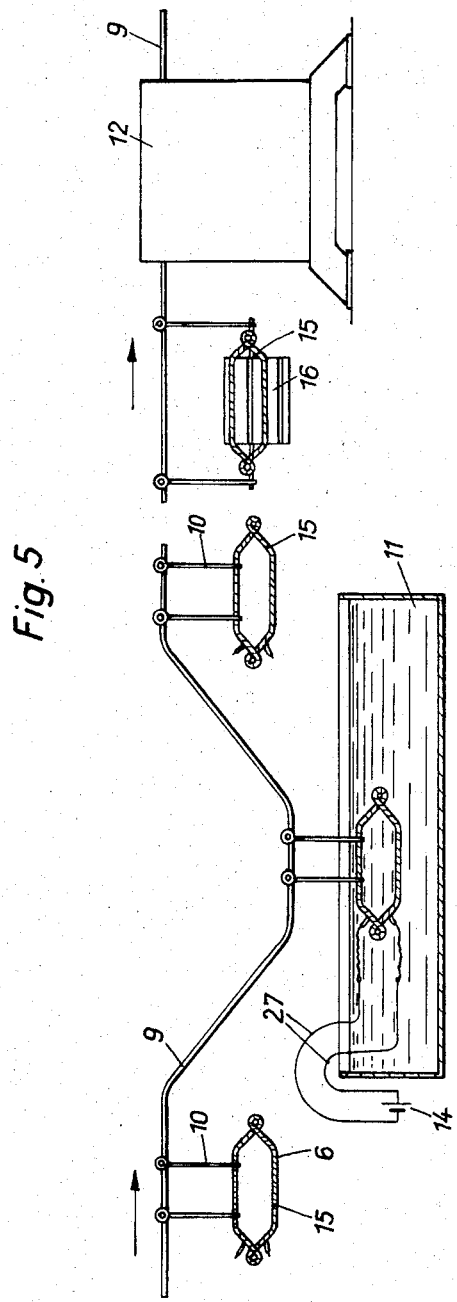

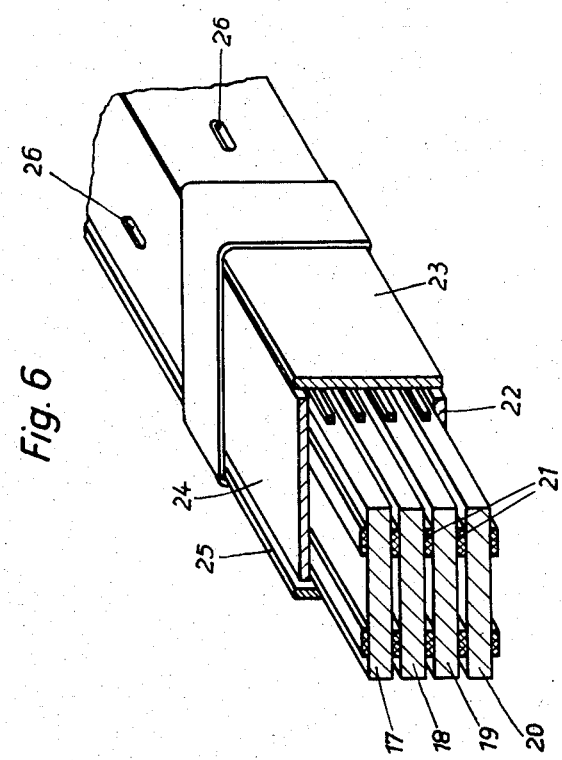

United States Patent Office 3,369,947
Patented Feb. 20, 1968

3,369,947
METHOD OF TREATING ARTICLES WITH POLYMERIZATION OR POLYADDITION REACTIONABLE SYSTEMS
Willi Mertens, Hartmut Meyer, and Jürgen Berger, Berlin, Germany, assignors to Siemens Aktiengesellschaft, Berlin-Siemensstadt, Germany, a corporation of Germany
Filed Apr. 7, 1964, Ser. No. 357,986
Claims priority, application Germany, Apr. 11, 1963, S 84,698
5 Claims. (Cl. 156—51)

ABSTRACT OF THE DISCLOSURE

Described is a method of treating articles of manufacture with polymerization- or polyaddition-reactionable systems of substances. The method comprises adding to the article an accelerator for the reaction and enveloping the article in an envelope permeable to said reactionable substance system when the latter is liquid. Thereafter, the enveloped article is immersed in a bath of said liquid substance system until, due to the accelerator, the viscosity of the substance penetrated into the envelope is sufficient to prevent the substance from draining out of the envelope. The enveloped article is then removed from the bath, and the hardening of the substance completed outside of the bath.

Our invention relates to the production of articles of manufacture by embedding or impregnating them with compositions capable of polymerization or polyaddition reaction. Such composition systems are employed, for example, as hardenable casting or impregnating resins for the insulation of conductors and other components in electrical machines, appliances and other apparatus. For example, high-voltage windings for electrical machines are being produced by winding mica tape about the conductors to be insulated, and thereafter impregnating the dried tape insulation on the conductors with a thermosetting impregnating resin to be subsequently hardened. It is also known to embed coils, transformers or current busses in thermosetting casting resin which rigidly encloses these components when hardened.

Our invention more particularly relates to improvements in techniques of the last-mentioned type, now being employed to a large extent for such purpose as insulating the winding conductors in the slots or on the poles of electrical machines and other electrical apparatus.

It is an object of our invention to reliably secure a complete filling of all gaps or interstices in an insulated article of manufacture, by eliminating any deficiencies or voids which may be due to shrinking of the resinous composition.

Another object of the invention is to afford using less costly and particularly simple molds or enveloping forms for the manufacture of an insulation-embedded or impregnated article.

According to our invention we provide the article to be produced, particularly a preliminary base insulation on an electrical component, with an accelerator for the polymerization or polyaddition reaction of the completely reactionable resinous composition system to be subsequently employed; and we envelop the article with the accelerator in an envelope material or structure permeable to the reactionable resinous composition substance when the latter is still liquid. Thereafter, we immerse the enveloped article in a bath of the liquid composition until after, due to the presence of the accelerator, the amount of composition that has penetrated into the envelope has gelled or increased its viscosity sufficiently to be prevented from escaping out of the envelope. We then remove the enveloped article from the bath and complete the hardening of the composition outside of the bath, preferably by heating the envelope and its contents.

The method of the invention reliably secures filling the envelope, as well as any gaps or interstices in the enveloped conductor or base insulation with a highest feasible proportion of the resinous composition. This is because draining of the composition from the envelope is prevented after the composition has sufficiently started to gel or become highly viscous while the article is still flooded with liquid composition, and also because, up to that stage, any shrinkage of the enveloped composition is being replenished by resinous material penetrating through the envelope from the liquid environment.

The invention also affords using simple and relatively cheap molds or envelopes for shaping the article to be produced. This is due to the fact that the envelope serves only for defining the desired contour but need not be tight. The requirements heretofore encountered with respect to such impregnating and casting operations, thus are greatly reduced, and the envelope material need only meet the requirement of good separating properties, i.e. that synthetic resins will not adhere thereto.

The method of the invention can be further improved by entering, into different volumetric portions of the article to be produced, respectively different accelerator compounds, and/or respectively different concentrations of accelerator substance which shortens the reaction time required for the polymerization or polyaddition reaction of the resinous composition system. Preferably the different concentrations of the added accelerator are so distributed that the volumetric portions of the article have a higher accelerator concentration in the interior than in the outer portions. In this case, the reaction and gel formation commences from the interior of the article and progresses toward the outside.

Suitable systems of substances capable of polymerization reaction for the purposes of the invention are solutions of unsaturated polyester resins in monomers, such as styrene, that are polymerizable onto the polyester resins. Other suitable systems of composite substances are polymerizable hydrocarbon mixtures, for example solutions of butadiene-styrene polymers in styrene or similar hydrocarbons. Also suitable for the purposes of the invention are mixtures, of styrene with cross-linking substances such as divinylbenzol, divinylacetylene or similar compounds. Further applicable are liquid vinyl-group-containing polysiloxanes, or bi- or poly-functional acrylates, or mixtures thereof.

The polymerization of these systems is initiated in known manner by organic peroxides. For completing the polymerization within a short period of time and minimizing the temperature level required for polymerization, the composition is given an addition of a compound which shortens the polymerization reaction and is adapted to the organic peroxide being used. Applicable as such compatible accelerator compounds for the above-mentioned substance systems capable of polymerization reaction are, for example, mixed aliphatic-aromatic tertiary amines, or oxygen-conveying metal salts. Suitable as such tertiary aliphatic-aromatic amines are dimethyl-p-toluidine, or compounds which contain a plurality of this group in the molecule, such as 4,4',4'' - dimethylaminotriphenylcarbinol. An accelerator example of a suitable metal salt is cobalt stearate.

Also suitable for the method of the invention are resinous system capable of a polyaddition reaction. Examples are epoxy-resin-accelerator mixtures with acid-anhydride hardeners. The polyaddition reaction of such resin-hardener mixtures can be accelerated by using additional compounds on the basis of tertiary amines, for example dimethyl-benzylamine, triisooctylamine or triethanolamine. In this case the accelerator to be added according to the invention may also consist of complex boron compounds in which the electron-octet gap of the boron atom is closed by a free electron pair of the nitrogen contained in a suitable amine compound, this being the case for example with triethanolamineborate or complex compounds of boron trifluoride and ethylamine or piperidine. Also suitable as accelerators for epoxide resin-hardener mixtures are zinc salts soluble in organic solvents, for example zinc oleate or zinc naphthenate.

As a rule, the maximum concentration of the above-mentioned accelerators for polymerization-reaction systems is preferably not higher than 1% by weight relating to the reactionable composition system. Relative to accelerators for polyaddition-reaction systems, the range in which these compounds may be added is larger, the maximum concentration of these compounds being in some cases as high as approximately 10%.

Preferably used as thermosetting resinous compositions for the purposes of the invention are solutions of unsaturated polyester resins in monomers attachable by polymerization to the polyester resins, together with added organic peroxide catalysts (polymerization reaction), or mixtures of epoxy resins with acid anhydride hardeners (polyaddition reaction). While bi- or poly-functional acrylates are also suitable for impregnating purposes according to the invention, aqueous acryl acid should not be employed because the water contained therein does not participate in the reaction and is not built into the system by the polymerization. Aqueous acrylic acid, therefore, is not among the composition systems designated as capable of polymerization or polyaddition reaction and required for the purposes of the invention.

When impregnating the enveloped article or embedding it in the still liquid casting resin, there is the danger that, when the reactionable composition system penetrates through the envelope into the volume of the article to be produced, the previously added accelerator compound may be rinsed out of the envelope by the liquid composition system. This can be prevented by mixing the accelerator with resins or other compounds that have low solubility in the entering composition, thus reducing the dissolving rate of the mixture. It is particularly preferable for this purpose to use low-solubility compounds or low-solubility resins which are compatible with the composition system employed for impregnating or embedding the article being produced, so as to become built into the molecule of the hardening system.

In some cases, however, the accelerator compound itself can be readily chosen to have low solubility in the composition system penetrating into the envelope. "Low solubility" is understood to mean that the dissolving of this accelerator, or of the resin mixed with the accelerator in the reactionable composition system, requires much more time than needed for the complete penetration of the reactionable system into the article being treated or produced. On the other hand, the dissolution of the accelerator must require considerably less time than that needed for obtaining the desired amount of gel formation. The examples of mutually compatible composition systems and hardeners satisfy this requirement.

The invention will be further described with reference to the accompanying drawings, in which:

FIG. 1 shows in perspective, schematically, a laminated mica tape.

FIG. 2 is a schematic and perspective view of a multiconductor rod for an electric machine winding, having a tape-wound insulation produced with insulating tapes according to FIG. 1.

FIG. 3 shows schematically an example of processing equipment for impregnating an insulation according to FIG. 2, the insulated conductors being inserted into an electrical machine component.

FIG. 4 shows schematically a modified portion of processing equipment otherwise corresponding to FIG. 3.

FIG. 5 shows schematically an example of processing equipment for insulating individual machine windings by the process of the invention; and FIG. 6 shows schematically and in perspective a portion of a machine-pole winding in an intermediate manufacturing stage of a process according to the invention.

The example described presently relates to the production of an insulating enclosure for the stator winding of a dynamoelectric machine. A portion of such a winding suitable for insertion into a slot of the laminated stator structure is shown in FIG. 2. For the purpose of insulating the assembly of individual conductors that constitute the winding, this assembly is first surrounded by several overlapping layers of mica tape such as the one illustrated in FIG. 1.

The insulating tape comprises a flexible supporting web 1 of paper, for example Japan (rice) paper of a few microns thickness, although a textile weave or synthetic foil may also be used. Based upon the base 1 are one or more layers 2 of mica flakes which are covered by a top layer 3 consisting preferably of the same material as the base layer 1. The mica flakes are bonded to each other as well as with the base and cover layers with the aid of a suitable cement. Preferably used as cement is an adhesive resin compatible with the impregnating resin to be subsequently used for impregnating the insulation so that the adhesive becomes built into the molecular system of the composition substance. Specific examples of such adhesives will be described hereinafter in conjunction with the particular impregnating compositions used. The preferred amount of adhesive, for example, is 4 to 5%, but may vary within the limits of about 3 to about 7%, relative to the total weight of the laminated mica tape.

The mica tape is also provided with the accelerator which is to subsequently shorten the polymerization or polyaddition reaction of the impregnating resin. The accelerator is preferably chosen so that it can be dissolved, together with the adhesive of the mica tape, in the impregnating resin during a longer interval of time than needed for the impregnating resin to penetrate through the insulation. However, this interval of time should be short with respect to the above-mentioned period within which a sufficient amount of gel formation is to occur. As a rule, the time needed for dissolving the accelerator should be within several minutes, whereas the required amount of gel formation is one, two or three hours, for example. Since again the accelerator substance to be added to the mica tape is preferably chosen for compatibility with the impregnating resin, specific substances that satisfy the just-mentioned conditions will be mentioned in a later place.

Several layers of the laminated mica tape prepared in the above-described manner are wound about the winding rod 4 which, according to FIG. 2, is composed of a multiplicity of mutually insulated component conductors. Thereafter, a tape 6 is wound upon the tape-wound insulation formed by the mica tapes 2. The tape 6 consists of a neutral material with respect to the above-mentioned reaction and hence does not contain accelerator substance. The envelope tape may consist of a mica tape of the same constitution as the tape 5 illustrated in FIG. 1, except that no accelerator substance is added. However, synthetic foil tapes, for example of polycarbonate foil, terephthalate foil or glass fiber may also be employed as envelope tape 6.

The conductor rods 4, thus enclosed by the accelerator-containing insulation and enveloped in the neutral envelope tape 6, inclusive of the conductor end turns, are placed into the slots of the stator which forms a component of the electrical machine. As shown in FIG. 3, the stator 8 with the inserted winding rods 4 is accommodated on a suspension structure 10 of a conveyor unit. The conveyor unit travels on a rail 9 and causes the stator 8 to be immersed in a bath 11 of resinous composition so that the stator 8 is completely flooded with the impregnating resin. If desired, the impregnation can also be effected in vacuum by having the bath located in a space kept under negative pressure.

The impregnating resin which forms the bath 11 consists of the above-mentioned composition systems capable of polymerization or polyaddition reaction. That is, the systems of substances applicable for this purpose have exclusively components that become built into the hardened resin, and the accelerators to be added to the above-mentioned insulating tape 5 are compatible with the impregnating resin in the same sense.

For example, the impregnating resin of bath 11 consists of a thermosetting epoxy resin-hardener mixture on the basis of bi- or higher functional glycidyl ethers, or epoxide compounds and acid anhydrides as hardeners. When using such an epoxy resin-hardener mixture in bath 11, the above-mentioned adhesive used in the mica tape (FIG. 1) may consist of hardener-free epoxide compounds, preferably bis-glycidyl ethers of diphenylolpropane. Also suitable as an adhesive in the mica tape 5 is the hardener-free epoxide compound consisting of an adduct from 1 mol of a phenol, for exampel a phenol, cresol or xylenol, and 1 mol of the bis-glycidyl ether of diphenylolpropane. Another suitable hardener-free epoxide compound to be used as a cement within the mica tape 5 is an adduct from 1 mol of the compound available under the trade name "Epoxide 201" (3,4-epoxy-6-methyl - cyclohexylmethyl - 3,4-epoxy-6-methylcyclohexanecarboxylate), and 0.3 to 0.5 mol of a dicarbon acid, for example cishexahydrophthalic acid.

Also with reference to the thermoplastic epoxide-resin hardener mixtures in bath 11, it is preferable to use as accelerator addition to the mica tape 5 the compound 4,4'-dimethylaminodiphenylmethane. A quantity of 5% by weight has been found best suitable, relating to the total weight of the mica tape.

Due to the presence of the accelerator in the mica tapes 5, the impregnating resin, which has penetrated from the bath 11 through the envelope wound about the conductor rods 4, commences to gel. Since the insulation of each conductor rod, inclusive of the end turns, is separated from the environment by the envelope consisting of the tapes 6 which do not contain accelerator substance, the gel formation is limited to the interior of the enveloped conductor assemblies. The same envelope formed by the tapes 6 also impedes or prevents the accelerator from being washed out into the bath 11, so that a long useful lifetime of the thermoplastic resin-hardener systems forming the bath is secured. However, the envelope formed by the tapes 6 is not tight with respect to the bath composition so that the penetration of the resin-hardener system into the interior of the envelope is not appreciably impeded, particularly when the impregnation is effected in vacuum.

The period of time during which the stator 8 is kept immersed in the bath 11 depends upon the impregnating resin being used, the accelerator contained in the enveloped insulation, and the temperature of the bath. In the preferred example here described, employing as impregnating resin a thermoplastic epoxide resin-hardener mixture on the basis of bi- or higher functional glycidyl ethers or epoxide compounds and acid anhydrides, and using 4,4'-dimethylaminodiphenylmethane as hardener in the mica tape, the bath temperature is preferably kept at 90° C. In this case the stator is immersed in the bath 11 for approximately 3 hours. Then the impregnating resin in the insulating envelopes of the conductor rods 4 has sufficiently commenced gelling to be prevented from draining out of the envelope.

After 3 hours immersion in the bath at 90° C., the stator is removed from the bath by passing the conveyor suspension structure 10 to the next processing step. Due to the gel formation inside the envelope of the conductor rods, the resin in these envelopes is already so highly viscous that the resin will not drain from the insulation as the stator is being lifted out of the bath. However, the resin can freely drain from the other parts of the stator where it has retained its low viscosity.

The stator 8 is subsequently run on the conveyor rail 9 into a furnace 12 in which the stator with the conductor rods is heated to the temperature required for ultimately hardening the initially gelled impregnating resin contained in the insulation. This temperature, as a rule, is higher than the temperature of the bath. In the specific example above described, a furnace temperature of about 130° C. is applied.

The heating required for ultimate hardening can also be effected by passing electric current through the insulated conductors. In this case, the furnace 12 according to FIG. 3 is not needed and is substituted by a device as schematically illustrated in FIG. 4. The ends of the conductor rods 4 are laid bare and are then connected to a voltage source 13. Although the source 13 is schematically shown as a battery, any other source supplying sufficient power can be employed, such as a transformer energized from an alternating-current utility line, or a generator provided for this purpose.

If desired, the envelope formed by the accelerator-free tapes 6 can be removed from the end turns of the conductor rods after the stator 8 has been removed from the bath 11 and before the ultimate hardening treatment is applied. However, if it is preferred to leave the envelope on the end turns (these being the conductor-rod portions that protrude out of the stator slots and are therefore visible in FIGS. 3 and 4), it is advisable to make certain that this exposed portion of the envelope will subsequently harden when subjected to the final heat treatment. For this purpose, the envelope formed of the tapes 6 is additionally provided with accelerator substance at the end turns before the ultimate hardening treatment is applied to the impregnating resin that has penetrated into the envelope. The hardener can be applied by brushing it onto the externally accessible envelope areas. In the specific example described above, the end turns are thus coated with 4,4'-dimethylaminodiphenylmethane before the heat treatment in furnace 12 according to FIG. 3 or by electric current according to FIG. 4 is applied.

The above-described gel formation of the impregnating resin penetrated into the envelope of the insulation can be further improved by giving the accelerator within the insulation a concentration that decreases from the interior in the outward direction. One way of doing this is to apply the accelerator to the mica tape 5 when it is being wound upon the conductor rod 4 and then applying to each subsequent tape layer the accelerator in a progressively lower concentration. Another way is to prepare respectively different mica tape according to FIG. 1 distinguished by different concentrations of added accelerator substance; and then forming the individual layers of mica tape 5 on the conductor according to FIG. 2 by first using mica tapes having a larger concentration of accelerator, and thereafter tapes of progressively decreasing accelerator concentration. By virtue of the decrease in concentration in the outward direction, the gel formation commences in the interior of the insulation when the conductor is immersed in the bath 11. This has the advantage that shrinkage is equalized by replenishment from areas where the impregnating resin still has a lower viscosity and also by impregnating resin still entering from the path through the envelope.

The accelerator-free envelopes which enclose the insulating sleeve toward the outside serve to perform two functions. In the first place, the envelopes are to separate the volume within which the gel formation is desired from the remainder of the bath in which an increase in viscosity is to be prevented as much as possible, without appreciably impeding the penetration of impregnating resin from the bath into the interior of the insulation. Secondly, the envelopes are to impart the desired external shape to the insulation to be produced.

In lieu of envelopes of the type described above, the entire stator 8 can be placed into an enclosing outer envelope or bag of paper, woven fabric or other web material permeable to the impregnating resin, and to then immerse the thus enveloped stator into the bath 11. This is of advantage in cases where, in addition to insulating the conductor rods of the stator, it is desired to have parts of the lamination stack cemented or sealed by the impregnating resin. Such other parts or areas of the stator are then likewise to be provided with accelerator substance.

The method described above with reference to impregnating a complete stator with an inserted winding, is also applicable to analogously complete rotors, as well as to individual winding rods or coils. Particularly suitable is the method for the impregnation of coils which must be greatly deformed when being inserted into the machine slots. Since the impregnating resin that has penetrated into the insulation of such coils has only started to gel when being taken out of the path, the coils can still be deformed readily, if necessary with moderate heating, to the extent required for placing them into the slots. After the coils are inserted into the slots, the impregnating resin contained in the insulation can be finally hardened, for example by passing electric current through the coils in the manner described above.

The just-mentioned method is embodied in the equipment illustrated in FIG. 5. The coil 15 for a rotor winding is completely insulated with mica tapes 5 and is enveloped with tapes 6 that do not contain accelerator, this part of the production being identical with the one described above with reference to the conductor rod 4 shown in FIG. 2. The winding 15 is hung onto the suspension structure 10 to travel along a conveyor rail 9 into the bath 11 of impregnating resin. The resin composition, the adhesive in the mica tape, and the accelerator added to the mica tape correspond to the respective substances of the example described above with reference to FIGS. 2 and 3. After sufficient gel formation in the impregnating resin that has penetrated into the insulating envelope of the coil 15, the coil is taken out of the bath 11.

The period of time required for such gel formation can be shortened by heating the coil 15 in the bath with the aid of electric current supplied from a current source 14 through connecting leads 27. Thus, the coil is maintained at a temperature above that of the surrounding bath. That is, with a bath temperature of about 90° C., the coil 15 is heated electrically to a temperature of about 110° C., for example. The interval of time required for sufficiently gelling the impregnating resin in coil 15 is thus shortened to about 30 minutes.

After the coil 15 is taken out of the bath 11 it can still be deformed because the entered resin has not yet hardened. The coil 15, therefore, can be readily placed into the slots of the rotor 16. After all individual coils, jointly forming the winding of rotor 16, are placed into the slots, the rotor 16 is conveyed into the furnace 12 for final hardening of the resin that has penetrated into the insulating envelopes of the winding. The final hardening can also be effected with the aid of an electrical heating device as described above with reference to FIG. 4.

The invention is further applicable for embedding electrical components, such as current bus bars or pole coils in casting resin. This permits providing the electrical components with relatively thin layers of casting resin. The following mode of the method is particularly well suited for producing articles that are to contain a high percentage of inactive filler substance.

The article is placed into a form or envelope which is permeable to the polymerization or polyaddition reaction system to be subsequently used for embedding or coating the object. In this form or envelope, the object is embedded in, or surrounded by, a filler substance of high thermal conductance. This is done preferably by pouring the granular filler substance onto and around the article. For the purpose of the invention it is further necessary to admix to the inactive filler substance an accelerator which is to subsequently shorten the reaction of the casting resin. The accelerator can be added before pouring the mixture into the form or envelope. However, the accelerator can also be added zone-wise when pouring respective batches of filler substance into the form. The latter mode is particularly advisable in cases where the accelerator is to have an outwardly decreasing concentration. When the filling operation is completed, the filled form is immersed in the reactionable composition system until the composition that has penetrated into the form has started to gel or to increase its viscosity to the extent required for preventing the composition from escaping. Thereafter, the form is taken out of the bath and the article is finally hardened outside the bath.

Due to the very high proportion of inactive filler substances entered by pouring it about the component in the envelope, the insulation thus produced can be given a thermal coefficient of expansion similar to that of metals. Thus, for example, coefficients of 15 to $20 \cdot 10^{-6}/°C$. are attainable with a filler content of at least 50 volumetric percent. Such a coefficient of expansion is in the same order of magnitude as the thermal coefficient of expansion for copper which is $17 \cdot 10^{-6}$. The invention, therefore, affords providing metallic conductors, particularly copper, with temperature resistant thin insulating layers of high heat conductance. This is a considerable advantage for highly loaded coils, for example the pole coils of electrical machines, because it improves the dissipation of the generated heat.

The production of a pole coil will be described presently as an example with reference to FIG. 6, showing a pole coil which comprises a number of flat copper conductors 17 to 20 placed flat on top of each other and separated by insulating spacer strips 21 a distance corresponding to the mutual position of the conductors in the finished coil. The stack of conductors are surrounded by a form constituted by four sheet-metal members 22 to 25. The members are not sealed along their edges so that the form is permeable to casting resin. For this purpose, the sheet-metal members 22 to 25 may be provided with additional openings 26, if desired.

The interspaces within the form thus consistituted by the sheets 22 to 25 is filled with an inactive filler substance, for example coarse quartz meal having a grain size of about 0.2 to 0.5 mm. Mixed with the filler substance is an accelerator for shortening the polymerization or polyaddition reaction of the casting resin. After the mixture of quartz meal and accelerator is poured into the form, the spaced strips 21 can be removed from between the flat copper conductors 17 to 20 because now the position of these conductors relative to each other and relative to the form is secured by a filler-accelerator mixture However, if desired, the spacer strips 21 may be left in the form.

After filling the form, it is immersed in a bath of the casting resin in the same manner as described above relative to the stator 8 and the winding 15 with reference to FIGS. 3 and 5. When the form is immersed in the bath, the casting resin enters through the gaps between the edges of the sheets 22 to 25, as well as through the openings 26. If desired, the complete penetration of the interior by the liquid casting resin can be promoted by application of vacuum. Since the form need not be tight, but must be permeable to the casting resin, the structural requirements are greatly reduced in comparison with the molds heretofore employed for embedding such electrical components in casting resins.

After the casting resin inside the form has started to sufficiently gel, the form is taken out of the bath and finally hardened in a furnance as described above with reference to FIGS. 3 and 5.

Suitable as casting resin are the above-mentioned polymerization and polyaddition reaction systems. Used as accelerators are the likewise mentioned compounds that shorten the polymerization or polyaddition reaction. Preferably employed are those accelerators that become dissolved in the casting resin only after a sufficiently long dwell time. Preferably used is a thermoplastic casting resin on the basis of bi- or higher functional glycidyl ethers or epoxide compounds with acid anhydrides as hardeners. Added as accelerator to the quartz meal is zinc stearate because this zinc salt dissolves in the casting resin only after a lapse of a short interval of time sufficient to prevent the salt from being rinsed out by the casting resin entering into the form. The temperature of the bath is 110° C. After about three hours, the casting resin in the form constituted by the sheets 22 to 25 has gelled to such an extent that the form can be taken out of the bath without draining the resin therefrom. The form is then heated in a furnace at 130° C. for completing the hardening of the insulation.

This method can also be improved by having the concentration of the accelerator added to the quartz meal decrease from the interior toward the outside. This is done, for example, by filling the interspace between the flat copper conductors 18 and 19 with a quartz meal mixture containing a higher proportion of accelerator than the mixture filled into the interspaces between the flat copper conductors 17 and 18 and between the conductors 19 and 20.

The described method affords producing a pole coil whose insulation possesses a volumetric share of more than 50% filler substance. By virtue of the high heat conductance of the filler substance, the thermal coefficient of expansion between the hardened insulation is substantially the same as that of the copper conductors enclosed by the insulation. The insulation of the pole coils, therefore, firmly adheres to the conductors when the coil is subjected to large temperature differences, even if the insulation is given only slight thickness such as 2 mm.

To those skilled in the art, it will be obvious, upon a study of this disclosure, that our invention permits of various modifications with respect to the compositions used and the particular articles treated or manufactured, and hence can be given embodiments other than particularly illustrated and described herein, without departing from the essential features of our invention and within the scope of the claims annexed hereto.

We claim:
1. The method of treating articles of manufacture with polymerization- or polyaddition-reactionable systems of substances, which comprises adding to the article an accelerator for the reaction in a concentration decreasing outwardly from the interior of the article, said article being at least partially permeable to said reactionable substance system when the latter is liquid and enveloping the article in an envelope permeable to said reactionable substance system when the latter is liquid; thereafter immersing the enveloped article in a bath of said liquid substance system until, due to the accelerator, the viscosity of the substance penetrated into the envelope is sufficient to prevent the substance from draining out of the envelope; then removing the enveloped article from the bath, and completing the hardening of the substance outside of the bath.

2. The method of producing electrical insulation upon an electrical conductor member according to claim 1, which comprises passing electric current through the immersed member to thereby heat the member and the enveloped composition.

3. The method of producing electrical insulation upon an electrical conductor member, which comprises surrounding the member with layers of insulating base material, adding to the layers an accelerator for subsequent reaction with a thermosetting resinous composition, said layers of base material are permeable to the resinous composition, enveloping the member in an envelope of accelerator-free material permeable to the resinous composition; immersing the enveloped member in a bath of the resinous composition until, due to the accelerator, the composition has sufficiently polymerized to a gel to prevent the composition from escaping out of the envelope; removing the enveloped member from the bath and completing the hardening of the enveloped composition outside of the bath.

4. The method of insulating conductor members in the winding slots of electrical machine components, which comprises surrounding the conductor members with windings of asbestos laminated tape, adding to the tape windings an accelerator for subsequent reaction with a thermosetting resinous composition, enveloping the conductor members with an envelope of accelerator-free material permeable to the reactionable composition, and inserting the conductor members into the slots of the machine component; immersing the machine component inclusive of the inserted conductor members into a bath of the resinous composition until, due to the accelerator, the composition has sufficiently polymerized to a gel to prevent the composition from escaping out of the envelope; removing the machine component from the bath and completing the hardening of the enveloped composition outside of the bath.

5. The method of insulating electrical conductor members within rigid casting resin, which comprises placing the conductor members into a rigid form envelope and in fixed spaced relation to each other and to the envelope, said envelope being permeable to the thermosetting resinous casting composition when still liquid, supplying the interstices between the envelope and the conductor members with a mixture or inactive filler substance and an accelerator for subsequent hardening reaction with the resinous composition; immersing the envelope with its contents into a bath of the resinous composition until, due to the accelerator, the viscosity of the composition penetrated into the envelope has sufficiently increased to prevent the composition from draining out of the envelope; removing the envelope with its contents from the bath and heating it outside the bath to complete the hardening of the composition.

References Cited

UNITED STATES PATENTS

| | | | |
|---|---|---|---|
| 2,821,498 | 1/1958 | Botts | 156—53 X |
| 2,860,072 | 11/1958 | Nischk et al. | 117—72 |
| 2,917,420 | 12/1959 | Foster et al. | 156—53 |
| 3,112,235 | 11/1963 | Blanchard | 156—310 |
| 3,127,470 | 3/1964 | Andersson et al. | 174—121 |

EARL M. BERGERT, *Primary Examiner.*
T. R. SAVOIE, *Assistant Examiner.*